(12) United States Patent
Fernandez et al.

(10) Patent No.: US 11,782,883 B1
(45) Date of Patent: Oct. 10, 2023

(54) SYSTEMS AND METHODS FOR MANAGING PERSONALIZED LIFE INFORMATION

(71) Applicant: United Services Automobile Association (USAA), San Antonio, TX (US)

(72) Inventors: Gabriel Carlos Fernandez, San Antonio, TX (US); Qunying Kou, San Antonio, TX (US); Arthur Quentin Smith, Fredericksburg, TX (US); Oscar Roberto Tijerina, San Antonio, TX (US); Mark Paxman Warnick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 202 days.

(21) Appl. No.: 17/103,072

(22) Filed: Nov. 24, 2020

Related U.S. Application Data

(60) Provisional application No. 62/940,656, filed on Nov. 26, 2019.

(51) Int. Cl.
*G06F 21/62* (2013.01)
*G06F 16/182* (2019.01)

(52) U.S. Cl.
CPC ...... *G06F 16/1834* (2019.01); *G06F 21/6227* (2013.01); *G06F 21/6245* (2013.01); *G06F 21/6272* (2013.01)

(58) Field of Classification Search
USPC ............................................. 726/27
See application file for complete search history.

(56) References Cited

U.S. PATENT DOCUMENTS

| | | | |
|---|---|---|---|
| 10,475,135 B2 * | 11/2019 | Anania | G06Q 30/0239 |
| 10,685,009 B1 * | 6/2020 | Rutley | G06F 16/23 |
| 10,733,616 B1 * | 8/2020 | Rutley | G06F 16/5854 |
| 2016/0088326 A1 * | 3/2016 | Solomon | H04N 21/254 725/12 |
| 2018/0101696 A1 * | 4/2018 | Wong | G06Q 10/0631 |
| 2019/0347741 A1 * | 11/2019 | Harkreader | G06Q 50/01 |
| 2021/0211468 A1 * | 7/2021 | Griffin | H04L 63/20 |
| 2022/0103434 A1 * | 3/2022 | Crowder | H04L 41/28 |

* cited by examiner

*Primary Examiner* — Sanchit K Sarker
(74) *Attorney, Agent, or Firm* — Fletcher Yoder P.C.

(57) ABSTRACT

Systems and methods described herein facilitate the management of personalized life information using a distributed ledger. For example, a distributed ledger system, such as one or more blockchains, may manage personalized life information of one or more individuals to, for example, determine an occurrence of a life event for a first individual based at least in part on personalized life information for the first individual, to access various types of personalized life information for the first individual in response to the determination of the occurrence of the life event for the first individual, and to provide a subset of the personalized life information data for the first individual to a user device associated with a second individual.

16 Claims, 5 Drawing Sheets

SYSTEMS AND METHODS FOR MANAGING PERSONALIZED LIFE INFORMATION

CROSS-REFERENCE TO RELATED APPLICATION

The present disclosure is related to, and claims priority to, U.S. Provisional Patent Application Ser. No. 62/940,656, titled "Systems and Methods for Managing Personalized Life Information," which was filed on Nov. 26, 2019, and which is herein incorporated by reference in its entirety for all purposes.

BACKGROUND

The present disclosure relates generally to the tracking personalized life information and, more particularly, to systems and methods for implementing personalized life information management using distributed ledger techniques.

Passing along personalized life information to family members, friends, and other acquaintances upon the occurrence of certain life events, such as death, comas, onset of dementia, and so forth, may provide the family members, friends, and other acquaintances with a certain degree of comfort during such trying life events. However, these life events quite often occur relatively suddenly and, without prior preparation, may otherwise preclude an individual from passing along such personalized life information.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include distributed ledger systems such as blockchain systems, application programming interfaces (APIs), and/or methods for operation thereof that may implement a distributed ledger infrastructure for managing personalized life information to, for example, the provision of such personalized life information to family members upon the occurrence of life events that may preclude users from providing this personalized life information to their family members themselves, and so forth.

In a first embodiment, a system includes at least one processor and at least one non-transitory computer-readable storage media communicatively coupled to the at least one processor. The at least one non-transitory computer-readable storage media stores instructions which, when executed by the at least one processor, cause the at least one processor to perform operations including determining an occurrence of a first life event for a first user. The operations also include accessing personalized life information data stored in a distributed ledger network in response to the determination of the occurrence of the life event for the first user. The personalized life information data relates to personalized life information for the first user. The operations further include providing a subset of the personalized life information data for the first user to a user device associated with a second user.

In a second embodiment, a method performed by at least one processor includes determining an occurrence of a first life event for a first user. The method also includes accessing personalized life information data stored in a distributed ledger network in response to the determination of the occurrence of the life event for the first user. The personalized life information data relates to personalized life information for the first user. The method further includes providing a subset of the personalized life information data for the first user to a user device associated with a second user.

In a third embodiment, one or more non-transitory computer-readable storage media store instructions which, when executed by at least one processor, cause the at least one processor to perform operations including determining an occurrence of a first life event for a first user. The operations also include accessing personalized life information data stored in a distributed ledger network in response to the determination of the occurrence of the life event for the first user. The personalized life information data relates to personalized life information for the first user. The operations further include providing a subset of the personalized life information data for the first user to a user device associated with a second user.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
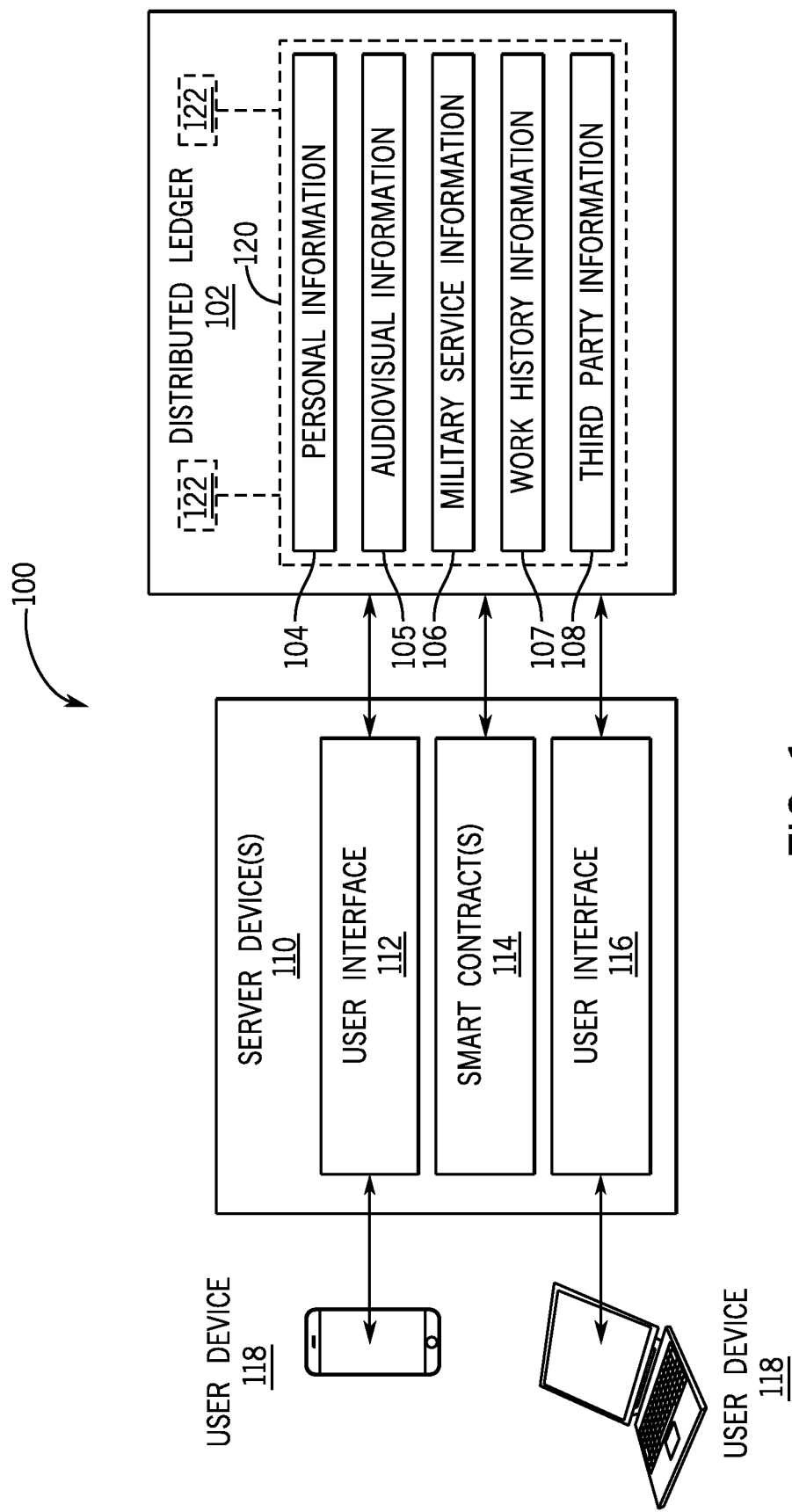
FIG. 1 illustrates a system for managing personalized life information, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to the management of personalized life information using distributed ledger techniques to, for example, facilitate the transfer of personalized life information from individuals to family members, friends, and other acquaintances upon the occurrence of certain major life events, which may otherwise preclude the individuals from passing along such information. As such, the embodiments described herein may provide efficient access to emotional connections to the individuals that might otherwise not be possible because of the occurrence of such major life events. For example, providing access to memories for family members, of which the family members may not even be aware, may provide emotional connections that might otherwise not be possible. For example, if a father passes away when a child is young, the embodiments described herein may provide information about the father to the child, which might otherwise be inaccessible. For example, the embodiments described herein may provide information to the child about what the father was like 30 years ago based on data about the father, which is stored in a distributed ledger network. Such information may help the child cope with the loss of their father. In certain situations, friends, military acquaintances, work associates, and so forth, could be identified that would allow the child to reach out to them to learn more about their father. In addition, certain audiovisual information may be captured by individuals that they would want to leave to their children upon their death. In addition, certain regularly occurring audiovisual information could also be captured.

In addition, the embodiments described herein may include artificial intelligence algorithms configured to determine if certain life events are occurring for an individual and, if so, prompting certain individuals to collect personalized life information for the individual that is experiencing the life event. For example, if data analyzed by the artificial intelligence suggests that a person has recently purchased their first car, a prompt may be automatically (e.g., without human intervention) generated to ask the person to take a picture of their first car. This photo, and the associated data, could be used to provide personalized life event timelines, for example. As another example, holiday activity could be identified and correlated to photos taken in association with the holiday activity by the artificial intelligence. In addition, correlations to other activity could be used by the artificial intelligence to encourage and monitor activity related to, for example, insurance, investment, and banking. For example, the artificial intelligence could identify that a user is planning a vacation, and automatically (e.g., without human intervention) prompt the user to create a virtual envelope to save for the vacation.

FIG. 1 illustrates a system 100 for managing personalized life information, in accordance with embodiments described herein. As shown in the example of FIG. 1, the system 100 may include a distributed ledger 102 that may include one or more blockchains. The distributed ledger 102 may be hosted on any suitable number of computing devices that operate as nodes for the distributed ledger 102. Such nodes may be geographically distributed in any suitable number of locations.

The distributed ledger 102 may store any appropriate number of data records of various types relating to personalized life information of certain users, including data relating to personal information 104, audiovisual information 105, military service information 106, work history information 107, and third party contact information 108, among other types of data. As described in greater detail herein, in certain embodiments, the data relating to personal information 104 may include identification information for a user, identified life events for the user, personality characteristics of the user, spending habits of the user, and hobbies of the user, among other data. In addition, in certain embodiments, the data relating to audiovisual information 105 may include photos of a user, videos of the user, and audio recordings of the user, among other data. In addition, in certain embodiments, the data relating to military service information 106 may include deployment locations at which a user was deployed, how long the user was deployed at the deployment locations, a time period during which the user was deployed at the deployment locations, type of deployment for the user when deployed at the deployment locations, military rank of the user when deployed at the deployment locations, one or more world events occurring at the time the user was deployed at the deployment locations, and military awards awarded to the user, among other data. In addition, in certain embodiments, the data relating to work history information 107 may include companies with which a user was employed, how long the user was employed by the companies, a time period during which the user was employed by the companies, job titles of the user while employed by the companies, and work accomplishments of the user while employed by the companies, among other data. In addition, in certain embodiments, the data relating to third party contact information 108 may include contact information for associates of a user, which may include family members of the user, friends of the user, military acquaintances of the user, and work acquaintances of the user, among other data. It will be appreciated that the types of data described herein are merely exemplary, and not intended to be limiting. Furthermore, it will also be appreciated that each of these types of data may be related to each other in a one-to-one or one-to-many manner, as appropriate, depending on the particular type of relationship between the data types.

One or more server devices 110 may have access to the distributed ledger 102. In certain embodiments, the server device(s) 110 may be nodes that host at least a portion of the distributed ledger 102. Alternatively, the distributed ledger 102 may be hosted on computing device(s) other than the server device(s) 110. The server device(s) 110 may include any suitable number and type of computing devices. In certain embodiments, the server device(s) 110 may execute one or more smart contracts 114 that facilitate management of personalized life information, as described in greater detail herein. In certain embodiments, the server device(s) 110 may provide a first user interface 112 and a second user interface 116. In general, the first user interface 112 may be used by users that wish to enter personalized life information relating to themselves or other users of the system 100, whereas the second user interface 116 may be used by users that access the personalized life information of other users, for example, upon the occurrence of certain life events for the users (e.g., death, comas, diagnoses of memory impairment, missing in action designations, and other major life events that may preclude such users from providing this information to surviving family members, for example), as described in greater detail herein. In certain embodiments, these user interfaces 112, 116 may be provided through a same portal, with different interfaces accessible to different types of users with different access permissions. In certain embodiments, the user interfaces 112, 116 may be web interfaces provided through a web site hosted by the server device(s) 110, and the user interfaces 112, 116 may be presented on user devices 118 through web browsers executing on those user devices 118. In certain embodiments, the user interface(s) 112, 116 may provide content to be presented through an application (e.g., app, mobile app) executing on the user devices 118.

The user device(s) 118 may include any suitable type of computing devices, including portable computing devices (e.g., smartphone, tablet computer, wearable computer, etc.). In certain embodiments, a first user (e.g., an individual wishing to store personalized life information about themselves) may access the first user interface 112 through a first user device 118, and a second user (e.g., an individual wishing to access the personalized life information about the first user) may access the second user interface 116 through a second user device 118. The second user interface 116 may also be used to proactively and automatically (e.g., without human intervention) prompt the second user of the existence of the personalized life information of the first user upon the occurrence of a major life event for the first user, such as death of the first user, a coma of the first user, a diagnosis of memory impairment (e.g., Alzheimer's disease or other causes of dementia) for the first user, or a missing in action designation for the first user, for example. For example, as described in greater detail herein, in certain embodiments, upon determining that the major life event has occurred for the first user, the server device(s) 110 may automatically (e.g., without human intervention) send a control signal to the second user device 118 to automatically (e.g., without human intervention) launch an application that includes the second user interface 116 to notify (e.g., display a message for) the second user of the major life event. Indeed, in certain embodiments, upon determining that the major life event has occurred for the first user, the server device(s) 110 may automatically (e.g., without human intervention) send a control signal to the second user device 118 to automatically (e.g., without human intervention) launch the application via one or more specific communication channels to minimize the impact that the communication between the server device(s) 110 and the user devices 118 has on other applications running on the user devices 118, for example.

For example, in certain embodiments, the server device(s) 110 may be configured to determine an occurrence of a life event for the first user based at least in part on data relating to personal information 104 for the first user stored in the distributed ledger 102, which may be entered via a first user interface 112, for example. In addition, in certain embodiments, the server device(s) 110 may be configured to access various types of personalized life information data stored in a distributed ledger 102 in response to the determination of the occurrence of the life event for the first user, wherein the personalized life information data relates to personalized life information for the first user including, for example, data relating to personal information 104, audiovisual information 105, military service information 106, work history information 107, and third party contact information 108, among other types of data. In addition, in certain embodiments, the server device(s) 110 may be configured to provide a subset of the personalized life information data (e.g., at least some of the data relating to personal information 104, audiovisual information 105, military service information 106, work history information 107, and third party contact information 108, among other types of data) for the first user to a second user device 118 associated with the second user. For example, in certain embodiments, upon determining that a major life event has occurred for the first user, the server device(s) 110 may automatically (e.g., without human intervention) send one or more messages to the second user device 118 (e.g., by automatically launching an application on the second user device 118), notifying (e.g., displaying a message for) the second user of the determined major life event for the first user and, in certain embodiments, providing access to the subset of the personalized life information data for the first user.

In certain embodiments, the server device(s) 110 may also be configured to determine whether the second user is authorized to access the subset of the personalized life information data for the first user before providing the subset of the personalized life information data for the first user to the second user device 118 associated with the second user by for example, determining a familial relationship between the first user and the second user, determining whether the first user has proactively granted access to the subset of the personalized life information data for the first user to the second user, and so forth. In addition, in certain embodiments, the server device(s) 110 may also include artificial intelligence algorithms configured to determine an occurrence of another (e.g., occurring previously in time) life event for the first user (e.g., a holiday, a birthday for the first user, an anniversary for the first user, a vacation for the first user, and so forth) based at least in part on data relating to personal information 104 for the first user stored in the distributed ledger 102, and to automatically (e.g., without human intervention) prompt one or more user devices 118 to collect additional personalized life information relating to the other (e.g., occurring previously in time) life event.

Use of a distributed ledger 102 (e.g., blockchain system) provides for personalized life information management that is relatively fast, inexpensive, ubiquitous, secure, and immutable. In addition, in certain embodiments, smart contract(s) 114 may be configured to perform operations to manage the personalized life information. In certain embodiments, the distributed ledger 102 may include a main blockchain 120 and one or more sidechains 122 that are linked to the main blockchain 120. In certain embodiments, the sidechains 122 may store personalized life information relating to a user, but be maintained by organizations other than the organization that maintains the main blockchain 120, and provide the information relating to the personalized life information for the user to the system 100 through the server device(s) 110.

Figure 2:
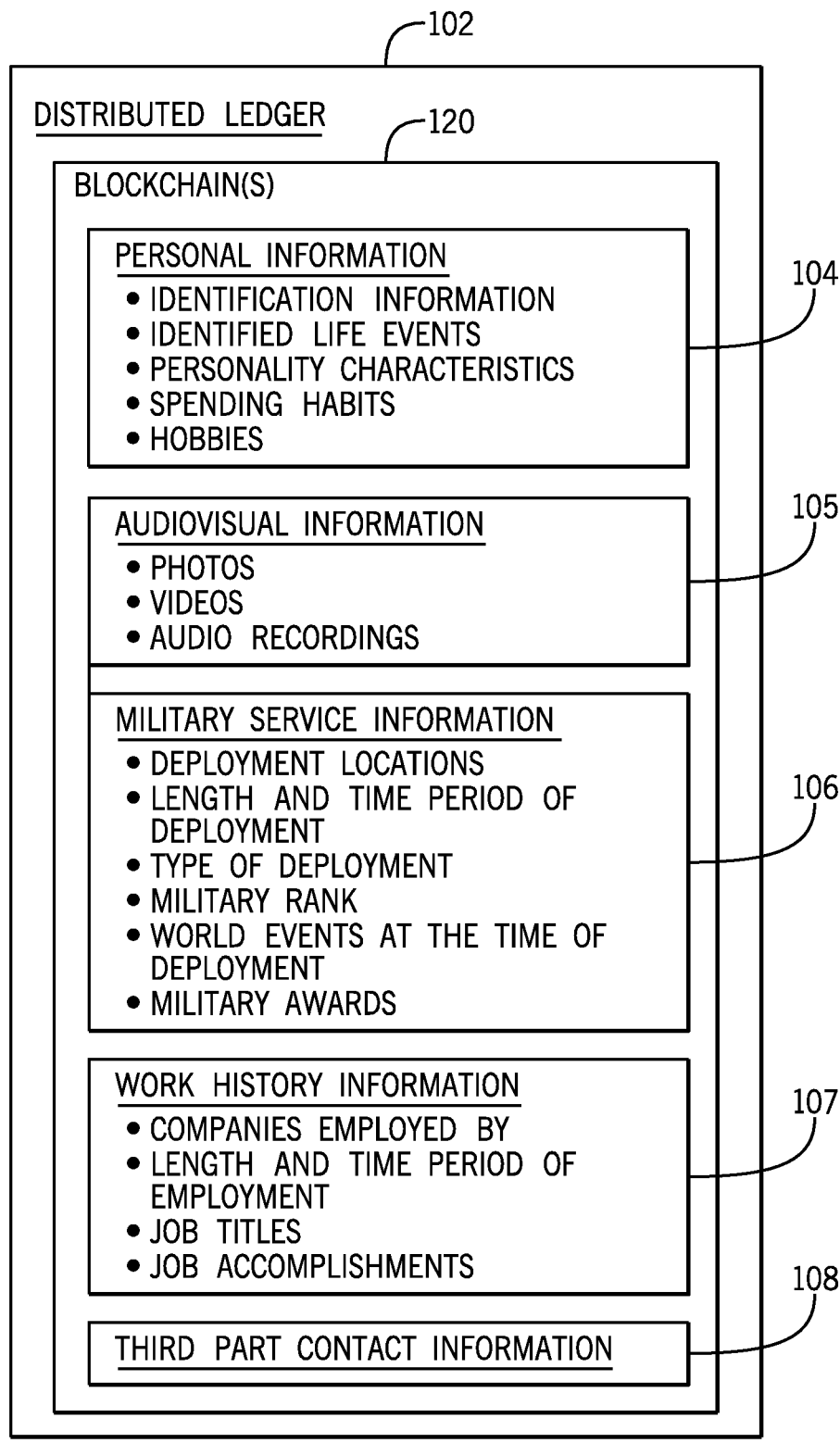
FIG. 2 illustrates certain types of data that may be stored in the distributed ledger (e.g., blockchain network) of FIG. 1, in accordance with embodiments described herein.

FIG. 2 illustrates certain types of data that may be stored in the distributed ledger 102 (e.g., blockchain network) of FIG. 1, in accordance with embodiments described herein. As described herein, the data stored in the distributed ledger 102 (e.g., blockchain network) may include data relating to personal information 104, audiovisual information 105, military service information 106, work history information 107, and third party contact information 108, among other types of data. As illustrated in FIG. 2, in certain embodiments, the data relating to personal information 104 may include identification information for a user. For example, in certain embodiments, the identification information for the user may include a full legal name, social security number, birth date, gender, height, weight, list of residential addresses including a current residential address, telephone number(s), email address(es), and so forth. In addition, in certain embodiments, the data relating to personal information 104 may include life events for the user, as described herein, which may be identified by the server device(s) 110, in certain embodiments. In addition, in certain embodiments, the data relating to personal information 104 may include personality characteristics of the user, such as whether the user was more gregarious as opposed to more introverted, whether the user was more jovial as opposed to more melancholy, and so forth. In addition, in certain embodiments, the data relating to personal information 104 may include spending habits and tracked hobbies of the user, which may give some indication of the types of things that were important to the user.

In addition, in certain embodiments, the data relating to audiovisual information 105 may include photos of a user (or that include the user), videos of the user (or that include the user), and audio recordings of the user (or that include the user), among other data. It will be appreciated that, in certain embodiments, facial recognition algorithms, voice recognition algorithms, and so forth, may be used (e.g., by the server device(s) 110 and/or the user devices 118) to identify photos, videos, audio recordings, and so forth, that include the user. In addition, in certain embodiments, the data relating to military service information 106 may include deployment locations at which a user was deployed, how long the user was deployed at the deployment locations, a time period during which the user was deployed at the deployment locations, type of deployment (e.g., combat vs. non-combat) for the user when deployed at the deployment locations, military rank (e.g., private, private first class, specialist, corporal, sergeant, etc.) of the user when deployed at the deployment locations, one or more world events (e.g., world wars, civil wars, insurgencies, and other conflicts) occurring at the time the user was deployed at the deployment locations, and military awards (e.g., orders of merit, service medals, campaign medals, distinguished service awards, and so forth) awarded to the user, among other data. In addition, in certain embodiments, the data relating to work history information 107 may include companies with which a user was employed, how long the user was employed by the companies, a time period during which the user was employed by the companies, job titles of the user while employed by the companies, and work accomplishments (e.g., employee of the year awards, salesman of the year awards, career service awards, and so forth) of the user while employed by the companies, among other data. In addition, in certain embodiments, the data relating to third party contact information 108 may include contact information (e.g., contact names, descriptions of acquaintances, mailing addresses, telephone numbers, email addresses, and so forth) for associates of a user, which may include family members of the user, friends of the user, military acquaintances of the user, and work acquaintances of the user, among other data.

As described in greater detail herein, all of the types of data (e.g., the data relating to personal information 104, audiovisual information 105, military service information 106, work history information 107, third party contact information 108, and so forth) stored in the distributed ledger 102 may be used by the server device(s) 110 to automatically (e.g., without human intervention using life event determination algorithms, such as artificial intelligence neural networks) determine an occurrence of a life event for a first user based at least in part on data relating to personal information 104 for the first user stored in the distributed ledger 102, to automatically (e.g., without human intervention) access various types of personalized life information data stored in a distributed ledger 102 in response to the determination of the occurrence of the life event for the first user, and to automatically (e.g., without human intervention) provide a subset of the personalized life information data for the first user to a user device 118 associated with a second user. For example, in certain embodiments, upon determining that a major life event has occurred for the first user, the server device(s) 110 may automatically (e.g., without human intervention) send one or more messages to the user device 118 associated with the second user (e.g., by automatically launching an application on the user device 118 associated with the second user), notifying (e.g., displaying a message for) the second user of the determined major life event for the first user and, in certain embodiments, providing access to the subset of the personalized life information data for the first user.

Figure 3:
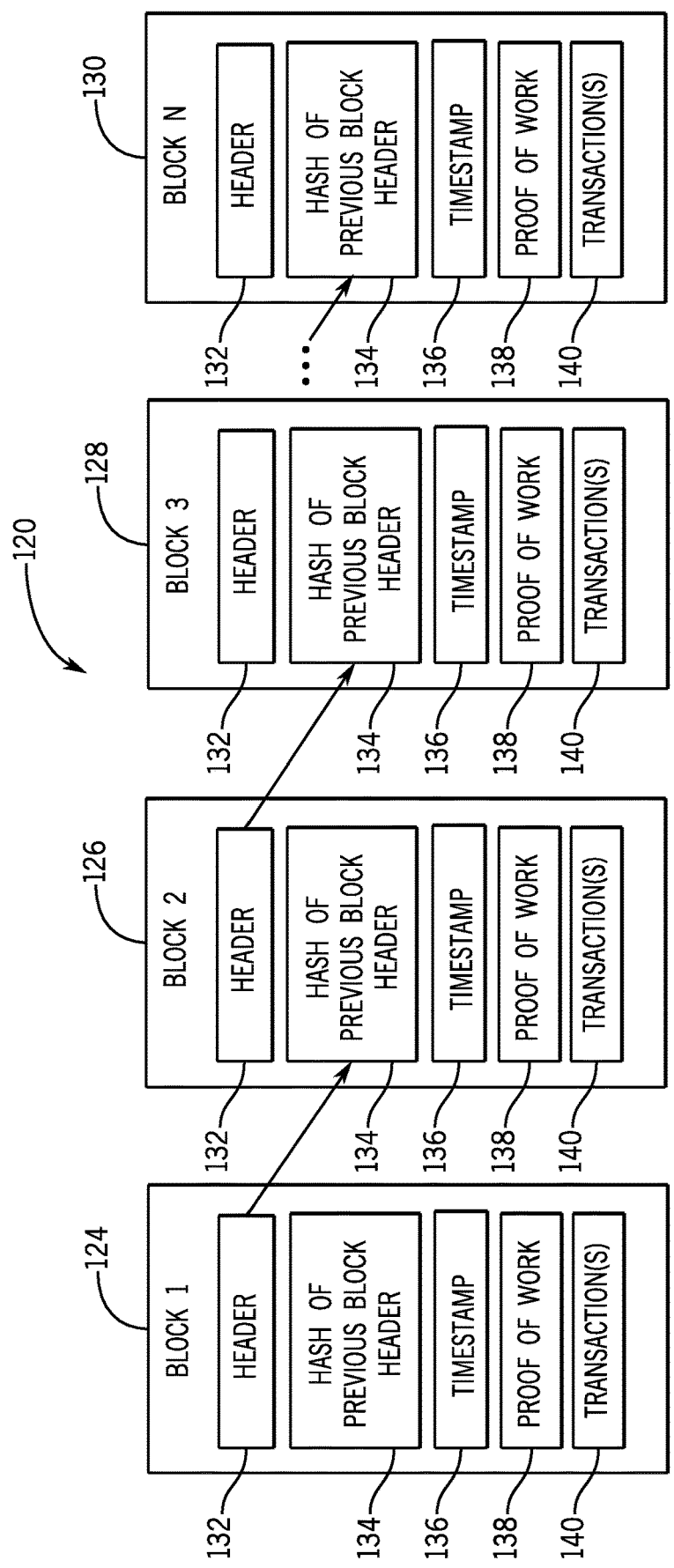
FIG. 3 illustrates a block diagram of a blockchain of the system of FIG. 1, in accordance with embodiments described herein.

FIG. 3 illustrates a block diagram of the blockchain 120 of the system 100 of FIG. 1, in accordance with embodiments described herein. In the illustrated embodiment, the blockchain 120 is illustrated as having multiple blocks 124, 126, 128, and 130. The block 124 (first block in the blockchain 120) may have been created, for example, by the server device(s) 110, and allocated as a special starting block. The block 124 may include a unique header 132 uniquely identifying the block 124 from other blocks in the blockchain 120. Because the block 124 is the first block in the blockchain 120, a hash of a previous block header 132 may be set to zero. A timestamp 136 may include the date of creation for the block 124, and a proof of work section 138 may include certain "work" that proves that a "miner" has performed work suitable for the creation of the block 124 and/or to verify transactions in the blockchain 120. The work section 138 may vary based on a protocol used to create the blockchain 120. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 120, and so on, down the tree. In other words, there is no way to create a fake value that would hash to an expected Merkle tree value (e.g., value stored in work section 138 of the block 124), thus creating a single value that proves the integrity of all of the transactions under it.

Transactions, such as updates regarding the data relating to personal information 104, audiovisual information 105, military service information 106, work history information 107, third party contact information 108, and so forth, may be stored in a transactions section 140. Data related to the particular transaction may also be stored in section 140 (or in another section), including the data relating to personal information 104, audiovisual information 105, military service information 106, work history information 107, third party contact information 108, and so forth. In certain embodiments, a new block may be created when personalized life information for a new user is to be tracked. For example, new data relating to personal information 104 for a new user may result in the creation of a new block. In another embodiment, empty blocks may be first created and then assigned, for example via the server device(s) 110, to new data relating to personal information 104 for a new user.

New data relating to audiovisual information 105, military service information 106, work history information 107, third party contact information 108, and so forth, may be similarly handled, in certain embodiments.

When a new block is created, the block will receive a new header 132 uniquely identifying the new block. As described in greater detail herein, a peer-to-peer network may include multiple "miners" (e.g., computing devices 118, 110) that add blocks to the blockchain 120 based on the blockchain protocol. In general, multiple miners validate transactions 140 that are to be added to a block, and compete (e.g., perform computing work, as introduced above) to have their respective block added to the blockchain 120. Validation of transactions includes verifying digital signatures associated with respective transactions 140. For a block to be added to the blockchain 120, a miner must demonstrate a proof of work before their proposed block of transactions is accepted by the peer-to-peer network, and before the block is added to the blockchain 120. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 134) in the blockchain 120, details of the transaction(s) 140 that are to be included in the to-be-created block, and a "nonce" value (e.g., a random number used only once).

Multiple nodes may compete to hash a set of transactions, and to provide the next block that is to be added to the blockchain 120. In certain embodiments, the blockchain protocol may provide a threshold hash to qualify a block to be added to the blockchain 120. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) 140 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 120. Consequently, the respective miner's block is broadcast across the peer-to-peer network (e.g., all user devices 118 communicatively coupled to the system 100). At this point, all other miners cease work (because one miner was already successful), and all copies of the blockchain 120 are updated across the peer-to-peer network to append the block to the blockchain 120. Each miner may produce hundreds of thousands (or more) of hash values, before any one miner provides a qualifying hash value (e.g., at least the first four characters of the hash value are each zero).

It is to be noted that any computing device, such as the user devices 118 and server devices 110, may be miners. Accordingly, for example, as new data relating to personal information 104, audiovisual information 105, military service information 106, work history information 107, third party contact information 108, and so forth, are created, new blocks may be added to the blockchain 120, including blocks 124, 126, 128, and 130. Indeed, the blockchain 120 may continue to grow, storing new data relating to personal information 104, audiovisual information 105, military service information 106, work history information 107, third party contact information 108, and so forth. Because of the distributed nature of the peer-to-peer network created via the distributed ledger 102, each node (e.g., devices 110, 118) may include copies of the blockchain 120 and share copies of the blockchain 120 as new peers enter the peer-to-peer network. Each copy of the blockchain 120 may include verified information for all or substantially all of the personalized life information data tracked by the distributed ledger 102. The information is secure, immutable, and more efficiently tracked as new added gets added via the distributed ledger 102.

Figure 4:
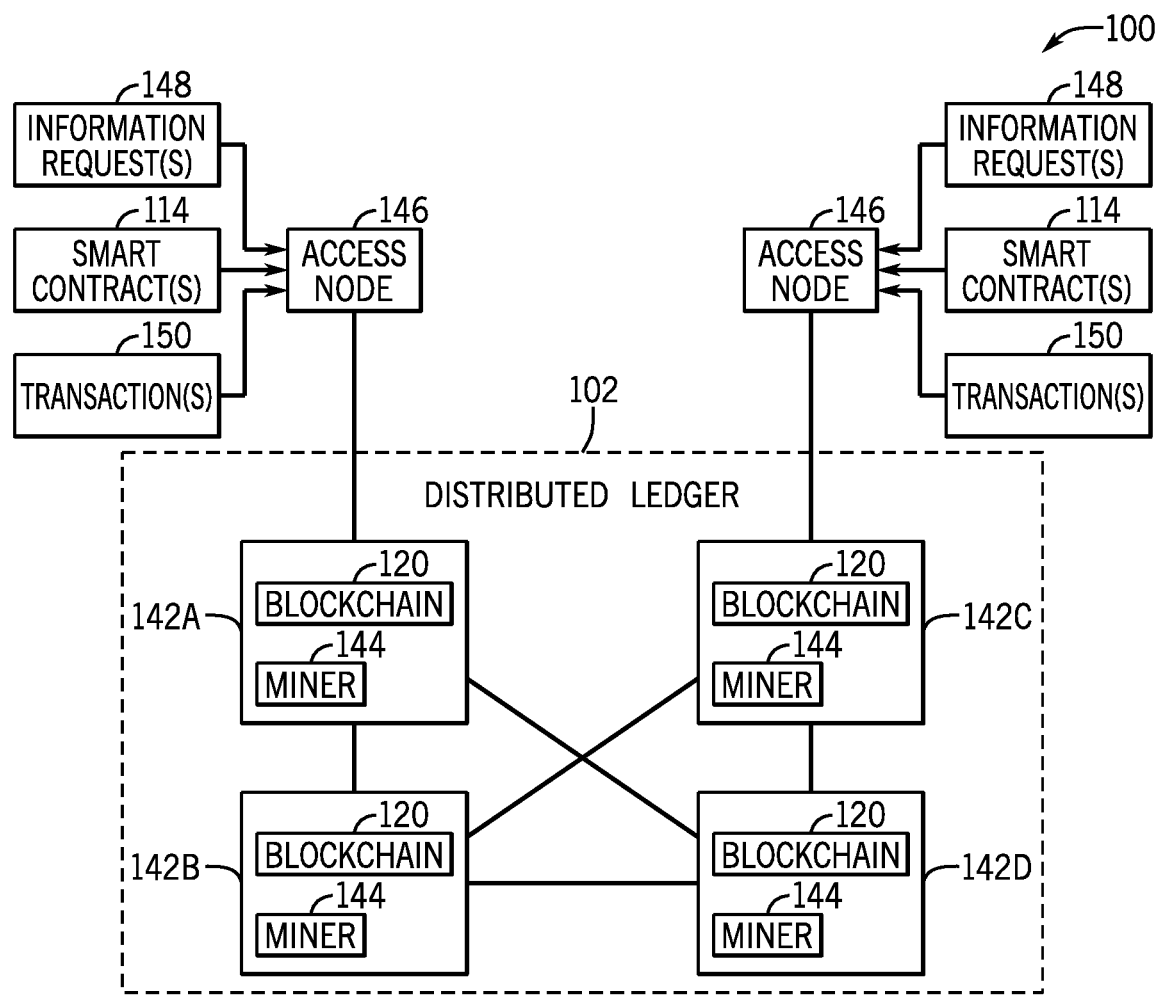
FIG. 4 illustrates a block diagram of the system of FIG. 1, which may be used to manage personalized life information using the distributed ledger (e.g., blockchain network), in accordance with embodiments described herein.

FIG. 4 illustrates the system 100 of FIG. 1, which may be used to manage personalized life information using a distributed ledger 102 (e.g., blockchain network), in accordance with embodiments described herein. As described herein, the distributed ledger 102 may be formed by several blockchain nodes, such as blockchain nodes 142A, 142B, 142C, and 142D, which may be implemented by a dedicated server or computer device, or may be implemented as a virtual machine in a shared computer system. Each blockchain node 142A-D may have in its memory a replicate of the blockchain 120. Each blockchain node 142A-D may also have a miner 144, an application that may verify the integrity of the blockchain 120, and may also perform operations and/or transactions using smart contracts 114 associated with the blockchain 120. As described herein, the blockchain 120 is a replicated data structure that may have its consistency and integrity preserved by a consensus mechanism performed by the miners 144.

Users may interact with the distributed ledger 102 via an access node 146. For example, users may request, through the access node 146, the recordation and/or processing of data (e.g., using a smart contract 114), such as an information request 148 (e.g., a request for the state of a smart contract 114), or a transaction request 150 (e.g., a request for a change in a state of the smart contract 114) to the blockchain 120. The smart contracts 114, information requests 148, and/or transaction requests 150 allow users to record certain data relating to personal information 104, audiovisual information 105, military service information 106, work history information 107, third party contact information 108, and so forth. Each access node 146 may be implemented by a computer terminal coupled to the distributed ledger 102.

A miner 144 from any of the blockchain nodes 142A, 142B, 142C, and 142D may create an update to the blockchain 120. In certain embodiments, the smart contract(s) 114 may be a data structure that may include states (e.g., internal states) and transaction instructions relating to the data stored in the blockchain 120. The transactions, or functions, may include instructions that modify the states of the smart contracts 114 and/or interact with other smart contracts 114 by performing further transactions. Examples of smart contracts 114 described herein include smart contracts 114 related to storing data relating to personal information 104, audiovisual information 105, military service information 106, work history information 107, third party contact information 108, and so forth, as described herein. Following insertion of a smart contract 114, the blockchain node 142 may propagate its update of the blockchain 120, and the other blockchain nodes 142 may accept the update using a consensus mechanism (e.g., proof of work, proof of stake, and so forth). For example, if blockchain node 142A generated a blockchain segment that incorporates some smart contract 114 to the blockchain 120, blockchain node 142A may propagate the updated blockchain 120 to blockchain nodes 142B, 142C, and 142D, which may validate and accept the updated blockchain 120.

Similarly, a transaction request 150 may be received by any miner 144 of the blockchain nodes 142A, 142B, 142C, and 142D via an access node 146. The transaction request 150 may perform operations that cause a change in the state of a smart contract 114 recorded in the blockchain 120. After performing the desired operations, and changing the state of the smart contract 114, in accordance with the transaction request 150, the miner 144 may update the blockchain 120 to record the updated state of the smart contract 114. The updated state of the smart contract 114 may be propagated to the blockchain nodes 142A-D, verified, and persisted using consensus mechanisms. An information request 148, similar to a transaction request 150, may be received by a miner 144, and may perform operations associated with a smart contract 114. However, in contrast with the transaction request 150, the information request 148 does not lead to changes in the state of the smart contract 114 and, thus, updates to the blockchain 120 that result from a successful information request 148 are not performed.

In certain embodiments, performance of the operations by the miners 144 of the blockchain nodes 142 may be incentivized and/or regulated by exchange of tokens (e.g., currencies) of the blockchain 120. For example, in public blockchains, updates to the blockchain 120 by a blockchain node 142A-D may be rewarded with a blockchain token. Moreover, performance of a transaction request 150 or an information request 148 may be rewarded with a blockchain token. For example, in certain embodiments, in the Ethereum public blockchain, updates to the blockchain from recordation of smart contracts 114 and information requests 148 may be rewarded with Ether tokens, and performance of transaction requests 150 and information requests 148 may be incentivized by offers of Ethers in the form of a secondary token called "gas". In certain private blockchain embodiments, tokens may be used to implement prioritization mechanisms for the operations and/or to prevent large or faulty operations from blocking the blockchain 120 with arbitrarily long operation times.

Figure 5:
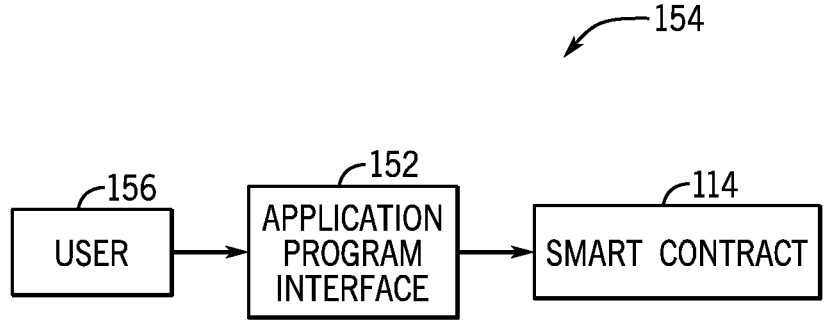
FIG. 5 illustrates an application program interface that may be used to interact with smart contracts, in accordance with embodiments described herein.

The infrastructure described herein may be accessed by an application program interface (API) 152, illustrated in diagram 154 of FIG. 5. In certain embodiments, the API 152 may be accessed from an access node 146. The API 152 may provide users 156 with an interface to the distributed ledger 102. It should be noted that the user 156 may be a human operator accessing a user interface 112, 116 provided by the API 152 or another software performing calls to a computer-accessible interface (e.g., a library) of the API 152. In certain embodiments, the API 152 may be loaded as an interface in an access node 146, or a resource available on the internet that may be accessed using a network application (e.g., a browser) in the access node 146. In certain embodiments, the API 152 may provide tools for creation and interaction with smart contracts 114. For example, the API 152 may convert the state and the functions of a smart contract 114 to binary code for storage and execution by miners 144 of the blockchain 120. In certain embodiments, the API 152 may also convert (e.g., compile) transactions 150 or information requests 148 to a binary message that may be transmitted to the blockchain 120 for execution by miners 144. In certain embodiments, the users 156 may access the smart contracts 114 using the APIs 152, which obey interaction protocols established by the smart contracts 114. Customization of the APIs 152 may allow integration between the system 100 and other internal applications of an organization that wishes to access the system 100.

In certain embodiments, the API 152 may include the option for signing smart contract transactions 150. The signature of the smart contract transaction 150 may include encryption methods using a public/private key infrastructure. For example, a user 156 may have a private key to sign the smart contract transaction 150, which provides proof that the contract was originated by the user 156. Moreover, public/private key infrastructure may also be used to encrypt transactions 150 and prevent unauthorized access. For example, a user 156 may encrypt a transaction parameter using a public key of the smart contract 114 to produce a transaction 150 that can only be readily understood by the smart contract 114. To interact with a smart contract 114, a user 156 may specify a type of smart contract 114, and the API 152 may provide a list of member functions of that particular smart contract 114. The user 156 may, then, choose the member function, and provide inputs or parameters associated with the transaction 150. It should be noted that certain transactions 150 and information requests 148 may require a digital signature for authorization, in certain embodiments. Digital signatures may use the same above-discussed public/private key.

To perform transactions 150, the API 152 may provide an option for the amount of "gas" that a user 156 is willing to use to incentivize performance of the transaction 150, as discussed above. The API 152 may request performance of the transaction 150 to the blockchain 120. The API 152 may receive from the blockchain 120 the results of the transaction 150, which may include an output of the transaction 150, an acknowledgment of execution and/or an indication of failure, when the transaction 150 causes an error, or if the amount of "gas" was insufficient to finalize the operation. It should be understood that the API 152 may provide an interactive user interface 112, 116 that may be accessed by a human user or an executable library that may be accessed by a computer system. The executable library facilitates access to the system 100 by other applications in the user computation environment.

Figure 6:
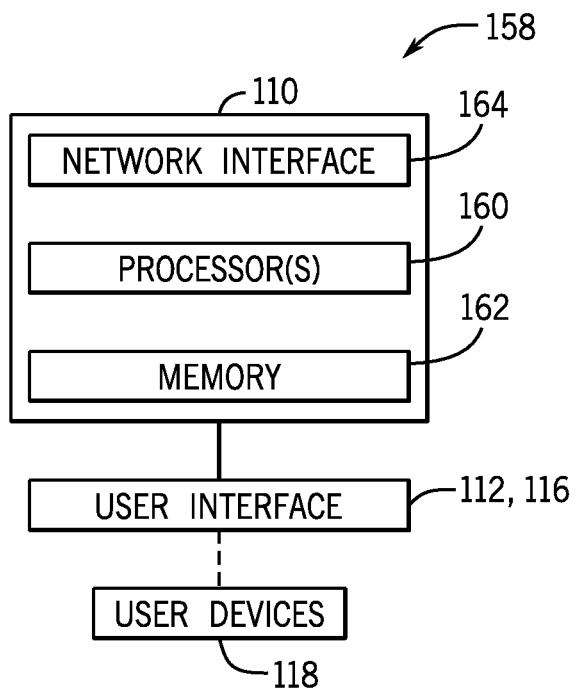
FIG. 6 illustrates a computing system, in accordance with embodiments described herein.

FIG. 6 illustrates a computer system 158 that may be used to implement electronic devices such as the blockchain nodes 142A, 142B, 142C, and 142D and the access nodes 146, in accordance with embodiments described herein. The computer system 158 may include one or more server devices 110, which each may include one or more processors 160 and one or more memories 162. In certain embodiments, the one or more processors 160 may refer to a single application specific integrated circuit (ASIC), to multiple ASICs, or to soft processing circuitry implemented in programmable logic devices, such as FPGAs and PLDs. In certain embodiments, the one or more processors 160 may implement universal processing architectures, such as a complex instruction set computer (CISC) architecture or a reduced instruction set computer (RISC) architecture. In certain embodiments, the one or more processors 160 may implement specialized processing architectures that may include instructions that include, but are not limited to, operations for blockchain mining.

In certain embodiments, the one or more memories 162 may include volatile memory for performance of operations (e.g., random access memory (RAM)) and persistent memory for long-term storage (e.g., hard disks, solid-state devices). Long-term storage may be optimized for durability and/or access speed times by resorting to configurations such as a redundant array of independent disks (RAID) device. In certain embodiments, a network interface 164 may include Ethernet-based connections, including copper wire network connections, backplane connections, and/or wireless (e.g., WiFi) network connections. The network interface 164 may also be implemented using other communication standards including, but not limited to, peripheral component interface express (PCIe) connections, Bluetooth connections, universal serial bus (USB) connections, and any other method for transmission of information between the blockchain nodes 142A-D and between access nodes 146 and blockchain nodes 142A-D. In certain embodiments, in access nodes 146, the network interface 164 may also facilitate integration between the API 152 and other computation resources of an organization (e.g., accounting management applications). In certain embodiments, the access nodes 146 and blockchain nodes 142A-D may also include user interfaces 112, 116 of the computer system 158. In certain embodiments, the user interfaces 112, 116 may be displayed via user devices 118.

As described in greater detail herein, in certain embodiments, the one or more memories 162 store instructions that, when executed by the one or more processors 160, cause the one or more processors 160 to perform operations that include, among other things, automatically (e.g., without human intervention using artificial intelligence algorithms, such as neural networks) determining an occurrence of a life event for a first user based at least in part on data relating to personal information 104 for the first user stored in a distributed blockchain network (e.g., the distributed ledger 102), which may be entered via a first user interface 112, for example. In addition, in certain embodiments, the one or more memories 162 store instructions that, when executed by the one or more processors 160, cause the one or more processors 160 to perform operations that include, among other things, automatically (e.g., without human intervention) accessing various types of personalized life information data stored in a distributed ledger 102 in response to the determination of the occurrence of the life event for the first user, wherein the personalized life information data relates to personalized life information for the first user including, for example, data relating to personal information 104, audiovisual information 105, military service information 106, work history information 107, and third party contact information 108, among other types of data. In addition, in certain embodiments, the one or more memories 162 store instructions that, when executed by the one or more processors 160, cause the one or more processors 160 to perform operations that include, among other things, automatically (e.g., without human intervention) providing a subset of the personalized life information data for the first user to a user device 118 associated with the second user. For example, in certain embodiments, the one or more memories 162 store instructions that, when executed by the one or more processors 160, cause the one or more processors 160 to perform operations that include, among other things, automatically (e.g., without human intervention) send one or more messages to the user device 118 associated with the second user (e.g., by automatically launching an application on the user device 118 associated with the second user), notifying (e.g., displaying a message for) the second user of the determined major life event for the first user and, in certain embodiments, providing access to the subset of the personalized life information data for the first user.

In addition, in certain embodiments, the one or more memories 162 store instructions that, when executed by the one or more processors 160, cause the one or more processors 160 to perform operations that include, among other things, automatically (e.g., without human intervention) determining whether the second user is authorized to access the subset of the personalized life information data for the first user before providing the subset of the personalized life information data for the first user to the user device 118 associated with the second user by for example, determining a familial relationship between the first user and the second user, determining whether the first user has proactively granted access to the subset of the personalized life information data for the first user to the second user, and so forth. In addition, in certain embodiments, the one or more memories 162 store instructions that, when executed by the one or more processors 160, cause the one or more processors 160 to perform operations that include, among other things, automatically (e.g., without human intervention using artificial intelligence algorithms, such as neural networks) determining an occurrence of another (e.g., occurring previously in time) life event for the first user (e.g., a holiday, a birthday for the first user, an anniversary for the first user, a vacation for the first user, and so forth) based at least in part on data relating to personal information 104 for the first user stored in the distributed ledger 102, and automatically (e.g., without human intervention) prompting one or more user devices 118 to collect additional personalized life information relating to the other (e.g., occurring previously in time) life event.

Figure 7:
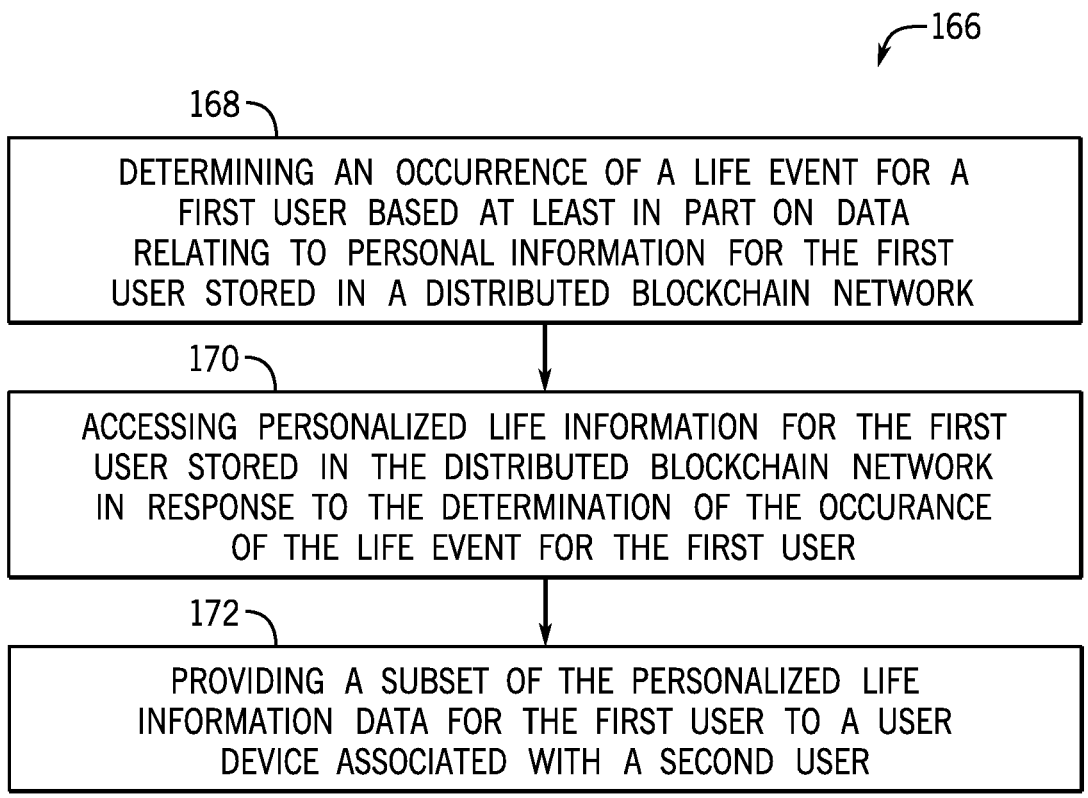
FIG. 7 a method for managing personalized life information using the distributed ledger, in accordance with embodiments described herein.

FIG. 7 illustrates a method 166 for managing personalized life information using the distributed ledger 102 described herein, which may be performed at least in part by one or more server devices 110. As illustrated in FIG. 7, in certain embodiments, the method 166 may include automatically (e.g., without human intervention using artificial intelligence algorithms, such as neural networks) determining an occurrence of a life event for a first user based at least in part on data relating to personal information 104 for the first user stored in a distributed blockchain network (e.g., the distributed ledger 102) (block 168). In addition, in certain embodiments, the method 166 may include automatically (e.g., without human intervention) accessing various types of personalized life information data stored in the distributed blockchain network (e.g., the distributed ledger 102) in response to the determination of the occurrence of the life event for the first user (block 170). The personalized life information data relates to personalized life information for the first user including, for example, data relating to personal information 104, audiovisual information 105, military service information 106, work history information 107, and third party contact information 108, among other types of data. In addition, in certain embodiments, the method 166 may include automatically (e.g., without human intervention) providing a subset of the personalized life information data for the first user to a user device 118 associated with the second user (block 172).

In addition, in certain embodiments, the method 166 may include automatically (e.g., without human intervention)

determining whether the second user is authorized to access the subset of the personalized life information data for the first user before providing the subset of the personalized life information data for the first user to the user device 118 associated with the second user. For example, in certain embodiments, the method 166 may include automatically (e.g., without human intervention) determining a familial relationship between the first user and the second user, determining whether the first user has granted access to the subset of the personalized life information data for the first user to the second user, and so forth. For example, in certain embodiments, the method 166 may include automatically (e.g., without human intervention) sending one or more messages to the user device 118 associated with the second user (e.g., by automatically launching an application on the user device 118 associated with the second user), notifying (e.g., displaying a message for) the second user of the determined major life event for the first user and, in certain embodiments, providing access to the subset of the personalized life information data for the first user.

In addition, in certain embodiments, the method 166 may also include automatically (e.g., without human intervention using artificial intelligence algorithms, such as neural networks) determining an occurrence of another (e.g., occurring previously in time) life event for the first user (e.g., a holiday, a birthday for the first user, an anniversary for the first user, a vacation for the first user, and so forth) based at least in part on data relating to personal information 104 for the first user stored in the distributed ledger 102, and automatically (e.g., without human intervention) prompting one or more user devices 118 to collect additional personalized life information relating to the other (e.g., occurring previously in time) life event.

As such, the embodiments described herein provide systems and methods for maintaining personalized life information in a relatively fast, inexpensive, ubiquitous, secure, and immutable manner. In addition, the embodiments described herein facilitate the storage and distribution of personalized life information to, for example, family members and friends upon the occurrences of major life events, such as death, comas, diagnoses of memory impairment, missing in action designations, and so forth, which might otherwise be lost and/or inaccessible by the family members and friends. Indeed, as described in greater detail herein, upon the determination that certain major life events have occurred for certain users, the embodiments described herein may automatically (e.g., without human intervention) send one or more messages to other users (e.g., by automatically launching an application on a user device 118), notifying (e.g., displaying a message for) them of the determined major life events. In addition, the embodiments described herein include artificial intelligence such as artificial neural networks, which learn over time to determine when certain major life events are occurring using the personalized life information that is collected using the systems and methods described herein. As such, the embodiments described herein enable management of certain types of personalized life information that would otherwise not be possible.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A system comprising:
at least one processor; and
at least one non-transitory computer-readable storage media communicatively coupled to the at least one processor, the at least one non-transitory computer-readable storage media storing instructions which, when executed by the at least one processor, cause the at least one processor to perform operations comprising:
determining an occurrence of a first life event for a first user, wherein the first life event comprises death of the first user, a coma of the first user, a diagnosis of memory impairment for the first user, or a missing in action designation for the first user;
accessing personalized life information data stored in a distributed ledger network in response to the determination of the occurrence of the first life event for the first user, wherein the personalized life information data stored in the distributed ledger network relates to personalized life information for the first user stored in the distributed ledger network prior to the occurrence of the first life event, wherein the personalized life information for the first user comprises personal information for the first user, wherein the personal information for the first user comprises one or more personality characteristics of the first user, one or more spending habits of the first user, or one or more hobbies of the first user;
determining whether a second user is authorized to access a subset of the personalized life information data stored in the distributed ledger network for the first user based on a familial relationship between the first user and the second user and based on a determination that the first user proactively granted access to the subset of the personalized life information data stored in the distributed ledger network to the second user prior to the occurrence of the first life event for the first user; and
providing the subset of the personalized life information data stored in the distributed ledger network for the first user to a user device associated with the second user.

2. The system of claim 1, wherein the operations comprise:
determining an occurrence of a second life event for the first user; and
prompting one or more user devices to collect additional personalized life information data to be stored in the distributed ledger network relating to the second life event in response to the determination of the occurrence of the second life event for the first user.

3. The system of claim 2, wherein the second life event comprises a holiday, a birthday for the first user, an anniversary for the first user, a major purchase for the first user, or a vacation for the first user.

4. The system of claim 1, wherein the personalized life information for the first user comprises audiovisual information relating to the first user, wherein the audiovisual information relating to the first user comprises one or more photos of the first user, one or more videos of the first user, or one or more audio recordings of the first user.

5. The system of claim 1, wherein the personalized life information for the first user comprises military service information for the first user, wherein the military service information for the first user comprises one or more deployment locations at which the first user was deployed, how long the first user was deployed at the one or more deployment locations, a time period during which the first user was deployed at the one or more deployment locations, type of deployment for the first user when deployed at the one or more deployment locations, military rank of the first user when deployed at the one or more deployment locations, one or more world events occurring at a time the first user was deployed at the one or more deployment locations, or military awards awarded to the first user.

6. The system of claim 1, wherein the personalized life information for the first user comprises work history information for the first user, wherein the work history information comprises one or more companies with which the first user was employed, how long the first user was employed by the one or more companies, a time period during which the first user was employed by the one or more companies, one or more job titles of the first user while employed by the one or more companies, or one or more work accomplishments of the first user while employed by the one or more companies.

7. The system of claim 1, wherein the personalized life information for the first user comprises third party contact information for one or more associates of the first user, wherein the one or more associates of the first user comprise one or more family members of the first user, one or more friends of the first user, one or more military acquaintances of the first user, or one or more work acquaintances of the first user.

8. The system of claim 1, wherein the distributed ledger network comprises one or more blockchains.

9. A method performed by at least one processor, the method comprising:
   determining an occurrence of a first life event for a first user, wherein the first life event comprises death of the first user, a coma of the first user, a diagnosis of memory impairment for the first user, or a missing in action designation for the first user;
   accessing personalized life information data stored in a distributed ledger network in response to the determination of the occurrence of the first life event for the first user, wherein the personalized life information data stored in the distributed ledger network relates to personalized life information for the first user stored in the distributed ledger network prior to the occurrence of the first life event, wherein the personalized life information for the first user comprises personal information for the first user, wherein the personal information for the first user comprises one or more personality characteristics of the first user, one or more spending habits of the first user, or one or more hobbies of the first user;
   determining whether a second user is authorized to access a subset of the personalized life information data stored in the distributed ledger network for the first user based on a familial relationship between the first user and the second user and based on a determination that the first user proactively granted access to the subset of the personalized life information data stored in the distributed ledger network to the second user prior to the occurrence of the first life event for the first user; and
   providing the subset of the personalized life information data stored in the distributed ledger network for the first user to a user device associated with the second user.

10. The method of claim 9, comprising:
    determining an occurrence of a second life event for the first user; and
    prompting one or more user devices to collect additional personalized life information data to be stored in the distributed ledger network relating to the second life event in response to the determination of the occurrence of the second life event for the first user.

11. The method of claim 10, wherein the second life event comprises a holiday, a birthday for the first user, an anniversary for the first user, a major purchase for the first user, or a vacation for the first user.

12. The method of claim 9, wherein the personalized life information for the first user comprises audiovisual information relating to the first user, wherein the audiovisual information relating to the first user comprises one or more photos of the first user, one or more videos of the first user, or one or more audio recordings of the first user.

13. The method of claim 9, wherein the distributed ledger network comprises one or more blockchains.

14. A non-transitory computer-readable storage media storing instructions which, when executed by at least one processor, cause the at least one processor to perform operations comprising:
    determining an occurrence of a first life event for a first user, wherein the first life event comprises death of the first user, a coma of the first user, a diagnosis of memory impairment for the first user, or a missing in action designation for the first user;
    accessing personalized life information data stored in a distributed ledger network in response to the determination of the occurrence of the first life event for the first user, wherein the personalized life information data stored in the distributed ledger network relates to personalized life information for the first user stored in the distributed ledger network prior to the occurrence of the first life event, wherein the personalized life information for the first user comprises personal information for the first user, wherein the personal information for the first user comprises one or more personality characteristics of the first user, one or more spending habits of the first user, or one or more hobbies of the first user;
    determining whether a second user is authorized to access a subset of the personalized life information data stored in the distributed ledger network for the first user based on a familial relationship between the first user and the second user and based on a determination that the first user proactively granted access to the subset of the personalized life information data stored in the distributed ledger network to the second user prior to the occurrence of the first life event for the first user; and
    providing the subset of the personalized life information data stored in the distributed ledger network for the first user to a user device associated with the second user.

15. The non-transitory computer-readable storage media of claim 14, wherein the operations comprise:
    determining an occurrence of a second life event for the first user; and
    prompting one or more user devices to collect additional personalized life information data stored in the distributed ledger network relating to the second life event in response to the determination of the occurrence of the second life event for the first user.

16. The non-transitory computer-readable storage media of claim 15, wherein the second life event comprises a holiday, a birthday for the first user, an anniversary for the first user, a major purchase for the first user, or a vacation for the first user.

\* \* \* \* \*